G. E. DRAPER.
TIRE VALVE.
APPLICATION FILED JAN. 31, 1921.

1,392,923.

Patented Oct. 11, 1921.

Inventor
George E. Draper
by his Attorneys
Baldwin & Wright

UNITED STATES PATENT OFFICE.

GEORGE E. DRAPER, OF PITTSBURG, KANSAS.

TIRE-VALVE.

1,392,923.    Specification of Letters Patent.    Patented Oct. 11, 1921.

Application filed January 31, 1921. Serial No. 441,251.

*To all whom it may concern:*

Be it known that I, GEORGE E. DRAPER, a citizen of the United States, residing at Pittsburg, in the county of Crawford and State of Kansas, have invented certain new and useful Improvements in Tire-Valves, of which the following is a specification.

This invention relates to valves of the kind applied to pneumatic wheel tires, and which are so constructed that air may be ejected through them to the interior of the tire, but which will to a great extent prevent the escape of air when the pump is withdrawn, the valve automatically closing and being held to its seat by pneumatic pressure. Such valves as heretofore constructed, while theoretically leak-proof, do leak to some extent, and the object of my invention is to provide a valve of this kind which is equipped with devices for preventing the escape of any air which may leak past the valve, said device being operated with the least possible degree of friction.

In carrying out my invention I provide a valve casing equipped with a valve of the usual kind, and I apply to the outer end of the casing a cap resembling that ordinarily used, but I mount within the cap a sealing device comprising a metal shell which holds a block of yielding material, such as rubber. The shell with the contained rubber block is loosely mounted in the cap and a ball is interposed between the inner wall of the end of the cap and the shell. The arrangement is such that when the cap is screwed home on the valve casing, the end of the cap will bear on the ball and cause the rubber block within its shell to be pressed upon the outer end of the valve casing and make an air tight connection therewith. The ball serves as an anti-friction device enabling the cap to be freely turned on the valve casing while compressing the rubber on the end thereof.

In the accompanying drawings:—

Figure 1:
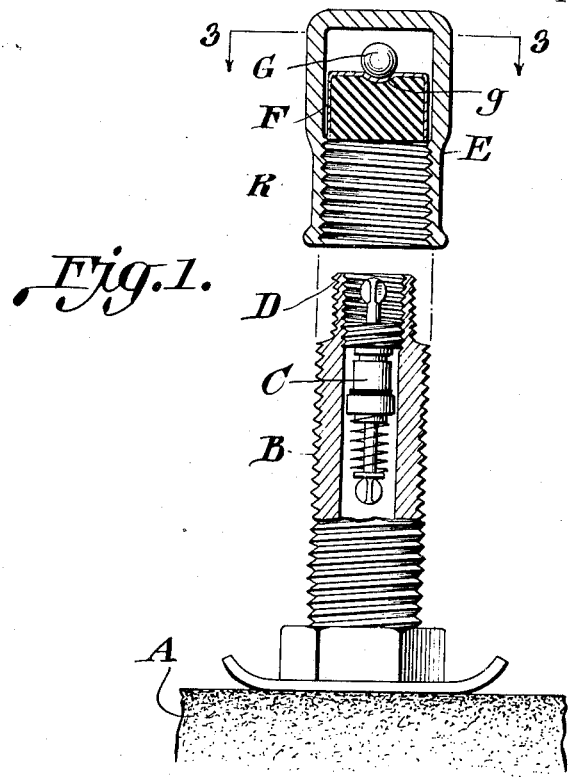
Figure 1 shows a longitudinal section through a tire valve embodying my improvements.
Figure 2:
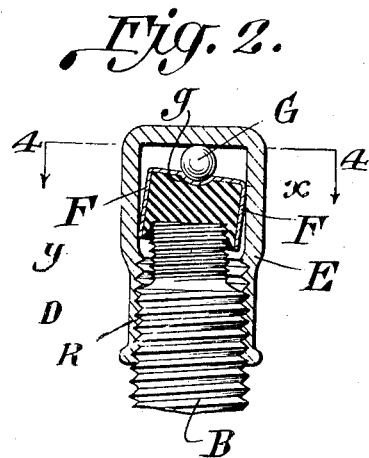
Fig. 2 is a detail view showing how the cap is applied to the valve casing and how the sealing device carried by the cap is made to have an air tight connection with the casing.
Figure 3:
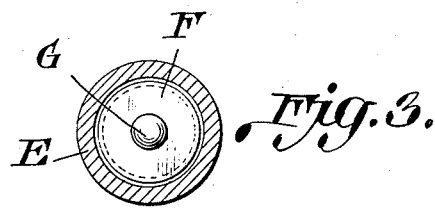
Fig. 3 shows a cross section on the line 3—3 of Fig. 1 looking in the direction of the arrows.
Figure 4:
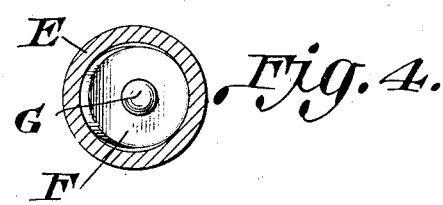
Fig. 4 shows a cross section on the line 4—4 of Fig. 2.

A valve casing B may be secured to a tire A in the usual way. It contains valve mechanism C of the usual kind and operating in the ordinary way. The valve casing is reduced and threaded at D to receive the air hose or pipe. The cap E is made shorter than the usual cap, it not being necessary to use the great multiplicity of screw threads ordinarily employed. The threaded part of the cap engages the threaded portion D on the valve casing while the threaded portion D extends into the upper portion of the cap freely as indicated in Fig. 2 when the cap is applied and screwed home. When the cap is thus applied and screwed home, the end D of the valve device is located a comparatively short distance from the outer end of the cap. Within the cap is placed a block of yielding material, such as rubber R, which is held within a shell F preferably made of metal. This shell preferably has a recess *g* to receive an anti-friction ball G. The shell and rubber block R fit comparatively loosely in the cap above the screw threads although the shell may be of such size that it may be forced into the cap and then sprung outward slightly so that it will not accidentally spring out of the cap, but the side walls of the shell do not fit tightly the unthreaded part of the cap. When the cap is screwed home in the manner indicated in Fig. 2, the rubber will be compressed and made to tightly fit the end of the member B. Experience has demonstrated that when the cap is applied in this way, the device will tilt in the manner shown and will rest against the cap at the points *x* and *y* so that there are three points of contact, namely, the points *x* and *y* and the part which contacts with the anti-friction ball G. In this way the device is securely held in place and will not wabble or get out of place after being once screwed home to the full extent. When turning the cap to produce the compression, the ball G materially lessens the friction and enables the rubber to be compressed to the greatest possible extent.

I claim as my invention:—

1. The combination with a threaded casing member of an automobile valve or the like, of a cap threaded to engage the threaded valve casing member, a sealing device within the cap comprising yielding material and a shell in which it is mounted, and an anti-friction ball interposed between the outer end of the shell and the inner wall of the end of the cap.

2. The combination with a threaded casing member, of a threaded cap, a sealing device within the cap comprising a block of yielding material, a shell inclosing it and which is formed with a recess or depression, and an anti-friction ball mounted in said recess.

In testimony whereof, I have hereunto subscribed my name.

GEORGE E. DRAPER.